United States Patent [19]

Miller

[11] Patent Number: 4,597,477

[45] Date of Patent: Jul. 1, 1986

[54] BIDIRECTIONAL BRAKE

[75] Inventor: Kent Miller, Rockford, Ill.

[73] Assignee: Sundstrand Corporation, Rockford, Ill.

[21] Appl. No.: 601,039

[22] Filed: Apr. 16, 1984

[51] Int. Cl.$^4$ ............................................. F16D 67/02
[52] U.S. Cl. ..................................... 192/8 R; 188/134
[58] Field of Search ......................... 192/8 R; 188/134

[56] References Cited

U.S. PATENT DOCUMENTS

| | | | |
|---|---|---|---|
| 1,833,224 | 11/1931 | Mullan et al. | 188/134 |
| 2,240,043 | 4/1941 | Kinser | 192/8 R |
| 2,359,009 | 9/1944 | Smith | 192/8 R |
| 2,391,172 | 12/1945 | Leland | 254/185 |
| 2,444,592 | 7/1948 | Creson | 192/8 R |
| 2,566,705 | 9/1951 | Mergen et al. | 192/8 R |
| 2,783,861 | 3/1957 | Jungles | 192/8 R |
| 2,925,157 | 2/1960 | Davis | 192/8 R |
| 3,285,377 | 11/1966 | Rasmussen | 192/8 R |
| 3,367,456 | 2/1968 | Bohnhoff | 188/134 |
| 3,497,044 | 2/1970 | Kalns | 192/8 R |
| 3,542,162 | 11/1970 | Kerr | 188/134 |
| 3,596,740 | 8/1971 | Nau | 188/134 |
| 3,621,958 | 11/1971 | Klemm | 192/8 R |
| 3,656,320 | 4/1972 | Belansky | 192/8 R X |
| 3,659,682 | 5/1972 | Meyer et al. | 188/134 |
| 3,695,402 | 10/1972 | Klemm | 192/8 R |
| 4,030,578 | 6/1977 | Cacciola et al. | 188/134 |
| 4,049,098 | 9/1977 | Kita et al. | 192/8 R |
| 4,091,900 | 5/1978 | Murteza | 192/8 R |
| 4,118,013 | 10/1978 | Christison et al. | 192/8 R X |
| 4,176,733 | 12/1979 | Twickler | 188/134 |
| 4,275,803 | 6/1981 | Putney | 188/134 |
| 4,480,733 | 11/1984 | Grimm et al. | 192/8 R |
| 4,483,429 | 11/1984 | Tiedeman | 192/8 R |

Primary Examiner—Rodney H. Bonck
Attorney, Agent, or Firm—Wood, Dalton, Phillips Mason & Rowe

[57] ABSTRACT

A bidirectional brake for use in a drive train to permit a rotary driving element to drive a rotary driven element but not the reverse including a rotary input shaft and a rotary output shaft coaxial with the input shaft. At least one rotatable brake element is carried by the output shaft and is rotatable therewith and at least one non-rotatable brake element is mounted in proximity to the rotatable brake element and engageable therewith. A spring normally urges the rotatable brake element away from the non-rotatable brake element and a limited lost motion connection is established between the shafts. A cam is responsive to relative rotary movement between the shafts for moving the rotatable brake element against the spring towards the non-rotatable brake element and a drag brake is operative associated with the input shaft.

2 Claims, 3 Drawing Figures

BIDIRECTIONAL BRAKE

FIELD OF THE INVENTION

This invention relates to a bidirectional brake, and more particularly, to a braking system operative to prevent a driven shaft from inadvertently driving the driving shaft in either direction due to inertial forces, loads applied to the driven shaft, etc.

BACKGROUND OF THE INVENTION

Over the years, there have been a variety of proposals for braking systems in drive trains of the sort having a driving shaft, typically connected to a prime mover, motor or the like, and a driven shaft typically connected to a load or the like. In many instances, as, for example, in positioning aircraft control surfaces, it is highly desirable that the driven shaft be prevented from overrunning the driving shaft in either direction of rotation. In the case of use of such systems for positioning aircraft control surfaces, such overrunning may be encouraged by inertial forces, i.e., the tendency of a flap or slat to continue in motion once set in motion by a controlling motor even when the input to the drive train from the motor has been stopped by de-energizing the motor, gravitational forces as when flaps are being lowered, and aerodynamic forces generated by the passage of the control surface through the air.

Where braking systems are not employed in drive trains utilized in such environments, such forces as mentioned immediately preceding may overcome the resistance in the positioning element, usually a control motor, with the consequence that a desired control surface configuration cannot be maintained without further and continual attention by the operator, typically a pilot.

Even where brake systems are incorporated in the drive trains used in such environments, difficulties may attend their use. For example, if there is a break in the drive train between the control elements and the input shaft to the braking system, the means normally employed to engage the brake, which are typically responsive to attempts at relative movement between the input and output shafts, may become ineffective due to a total lack of resistance to movement of the input shaft.

In order to overcome this difficulty, many prior art systems have resorted to the use of normally engaged brakes which can be disengaged only upon movement of the input shaft. To assure adequate braking, relatively large springs are employed in such normally engaged braking systems and as a consequence, input torque to the input shaft must necessarily be large to disengage the heavily loaded brake. Moreover, the large springs of necessity have greater weight than would smaller springs and it is well recognized in the aircraft industry that weight is a substantial concern in the construction and operation of aircraft.

In some systems, the drive connection between the input shaft and the output shaft is not positive. Such systems have the disadvantage that when slippage between the two occurs, indication to the operator or pilot of the position of the surface being controlled is not coordinated with the actual position of such surface or with other control surfaces whose positions must be considered as well; or if compensation is made to maintain coordination of indication, additional components, all carrying a weight penalty, must be included.

The present invention is directed to overcoming one or more of the above problems.

SUMMARY OF THE INVENTION

It is the principal object of the invention to provide a bidirectional brake for use in a drive train to permit a rotary driving element to drive a rotary driven element but not the reverse.

According to the invention, there is provided a rotary input shaft and a rotary output shaft coaxial with the input shaft. At least one rotatable brake element is carried by one of the shafts and is rotatable therewith. There is also provided at least one non-rotatable brake element mounted in proximity to the rotatable brake element and engageable therewith. Spring means are provided for normally disengaging the brake element and a limited lost motion connection interconnects the two shafts. Cam means are responsive to relative rotary movement between the shafts for engaging the brake elements against the spring means.

According to a preferred embodiment of the invention, there is provided an additional drag brake on the input shaft for the purpose of assuring sufficient resistance to its rotation to assure that the cam means will operate to engage the brake elements. Thus, the cam means may include a cam element mounted on the input shaft for axial, but non-rotatable movement relative thereto. An additional, non-rotatable brake element is adapted to be engaged by the cam element to provide the desired drag on the input shaft.

According to one embodiment of the invention, the limited lost motion connection comprises tangs carried by one of the shafts which are loosely received in aligned slots on the other of the shafts.

The cam means preferably comprise a ball ramp cam.

Other objects and advantages will become apparent from the following specification taken in connection with the accompanying drawings.

DESCRIPTION OF THE PREFERRED EMBODIMENT

Figure 1:
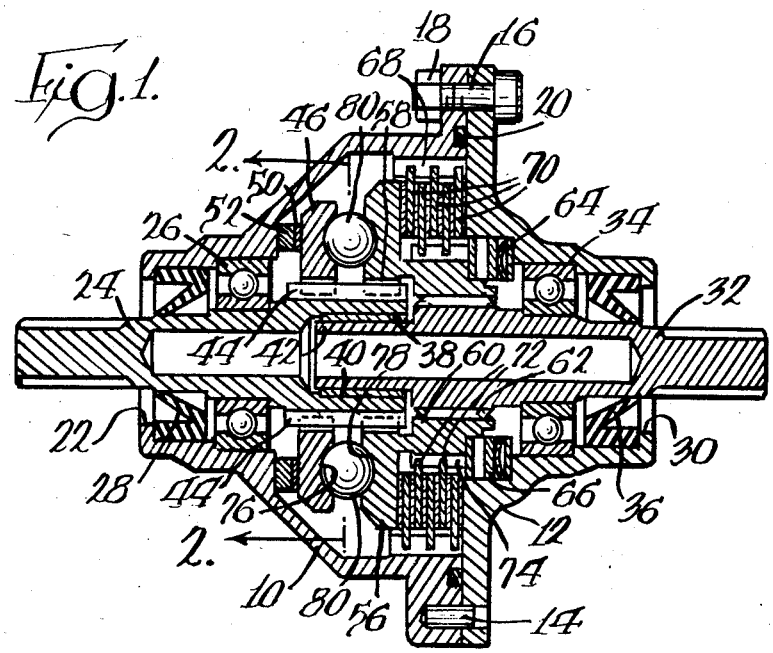
FIG. 1 is a sectional view of a bidirectional brake made according to the invention.

An exemplary embodiment of a bi-directional brake for use in a drive train to permit a rotary driving element to drive a rotary driven element but not the reverse is illustrated in FIG. 1 and is especially adapted to be employed in the drive train for control surfaces of aircraft. However, it will be appreciated that its use is not so limited and that it may be employed in a variety of other environments where the foregoing driving conditions are desirable. The brake includes first and second bell-shaped housings 10 and 12 which may be oriented with respect to each other by locating pins 14 (only one of which is shown) and secured in the desired configuration by a series of bolts 16 and nuts 18 (only one of each is shown) passing through suitably aligned apertures in the components. An O-ring seal 20 or the like may be disposed at the interface of the housings 10 and 12.

The housing 10 includes a central opening 22 from which an input shaft 24 extends. The input shaft 24 is adapted to be coupled by any suitable means to a control element such as a prime mover, motor, lever or the like. The input shaft 24 is journalled within the housing 10 by bearings 26 and a suitable wiper seal 28 may be located within the housing 10 to seal against the shaft 24 immediately adjacent the opening 22.

The housing 12 has a similar central opening 30 from which an output shaft 32 extends. The output shaft 32 is adapted to be connected by any suitable means to a load, such as a highlift or control surface on an aircraft. Bearings 34 within the housing 12 mount the shaft 32 coaxially with the shaft 24 and a seal 36 similar to the seal 28 sealingly engages the output shaft immediately adjacent the opening 30.

The end of the shaft 24 within the housing 10 terminates in an enlarged central opening 38 which receives a bearing sleeve 40 which in turn journals an end 42 of the output shaft 32.

Figure 2:
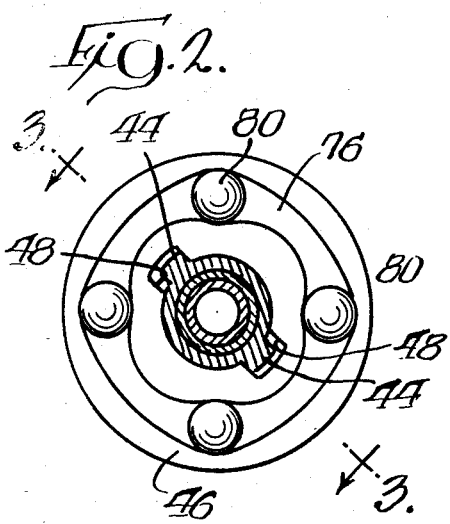
FIG. 2 is a sectional view taken approximately along the line 2—2 in FIG. 1.
Figure 3:
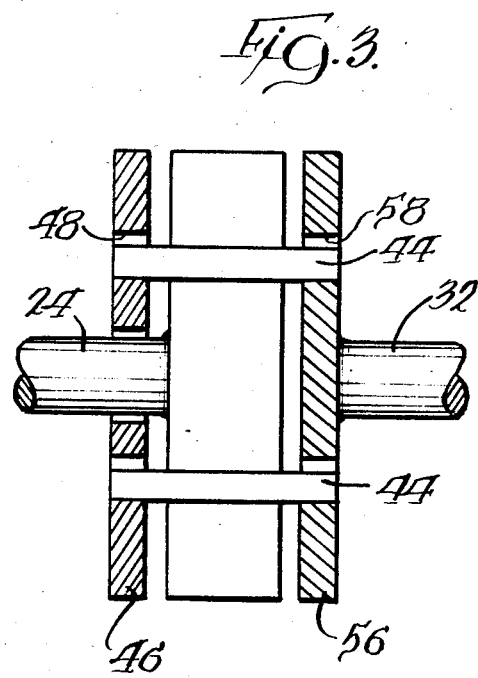
FIG. 3 is a roll out view taken along the line 3—3 in FIG. 2 with certain components shown out of position for clarity.

The radially outer surface of the shaft 24 within the housing 10 includes axially elongated, radially outwardly directed tangs 44 (see also FIG. 2) whose size and number is selected dependent on intended loading. A cam element or disk 46 is mounted on the shaft 24 and includes radially inwardly opening slots or grooves 48 loosely receiving the tangs 44 as best seen in FIG. 2. As a consequence of this construction, the disk 46 is essentially non-rotatable with respect to the shaft 24 (some relative rotary movement may occur within the confines of the slots 48) and is axially slidable thereon. The side of the disk 46 opposite the shaft 32 carries a brake element 50 which is engageable with a brake element 52 stationarily mounted on the interior of the housing 10. As a consequence of this construction, engagement of the brake elements 50 and 52 upon axial movement of the disk 46 on the shaft 24 toward the left as viewed in FIG. 1 will produce a drag on the shaft 24.

Within the housing 10 there is also contained a second cam disk 56 which receives the tangs 44 in radially inwardly opening slots 58 identical to the slots 48. The disk 56, on its side facing the output shaft 32 includes an integral collar 60 having a splined connection 62 to the output shaft 32. As a consequence of this construction, the disk 56 is axially movable on the shaft 32 but non-rotatable with respect thereto.

At the same time, the limited movement permitted the tangs 44 within the slots establishes a limited lost motion connection between the shafts 24 and 32.

Within the interior of the housing 12, there is located an annular spring formed of a wavy spring member 64 which acts through a thrust bearing 66 against the collar 60 on the disk 56. Thus, as viewed in FIG. 1, the collar 56 is normally urged to the left by the spring 64.

Internal splines 68 within the housing 10 mount, for slidable movement in the axial direction, any desired number of non-rotatable brake elements 70 concentrically about the shafts 24 and 32. Interposed between alternate ones of the non-rotatable brake elements 70 are rotatable brake elements 72 mounted to the disk 56 by axially elongated splines 74 on the radially outer surface of the collar 60.

As a result of this construction, a brake pack defined by the brake elements 70 and 72 is provided and a brake actuating member for compressing the pack to engage the brake elements is provided by the disk 56. The action of the spring 64 against the disk 56 serves to provide a normally disengaged brake construction.

The basic construction is completed by ball ramp grooves 76 and 78 on the facing surfaces of the disks 46 and 56 respectively; and which jointly receive a series of balls 80. The configuration of the ball ramp grooves 76 is illustrated in FIG. 2 and the ball ramp grooves 78 may have an identical configuration. In either case, it will be observed that the groove narrows from the location of each ball 80 as the adjacent ball is approached until the mid point of the distance is achieved, at which time the groove 76 or 78 again begins to widen. As a consequence of this configuration, relative movement between the disks 46 and 56 will tend to force the ball 80 into a narrower portion of the grooves 76 and 78 thus forcing the ball 80 out of the grooves 76 and 78. As can be appreciated in FIG. 1, this will result in the balls exerting an axially directed force tending to separate the disks 46 and 56.

In operation, the limited lost motion connection between the input and output shafts 24 and 32 defined by the tangs 44 and their loose receipt in the grooves 48 and 58 assures a positive drive which in turn allows coordination of indication of the driving shaft position with the driven shaft position. At the same time, it provides for a small amount of movement between the two necessary to cause the plates 46 and 56 to be cammed apart by action of the balls 80 within the grooves 76 and 78. Whenever the output shaft 32 tends to overrun the input shaft 24, regardless of the direction of rotation being applied, the resulting movement of the disk 56 will cause the tangs 44 to be engaged by the opposite side of the grooves 58 in which they reside without requiring any movement of the shaft 24. As a consequence of such movement, the disk 56 will be cammed to the right as viewed in FIG. 1 compressing the brake pack defined by brake elements 70 and 72 to thereby engage the same and hold the output shaft 32 stationary or retard its rotational rate sufficiently to return to synchronization with the input shaft 24. If a return to synchronization is achieved, the disks 46 and 56 will orient themselves with respect to each other so as to allow the balls 80 to enter the deepest part of the grooves 76 and 78 thereby allowing the spring 64 to disengage the brake pack.

It will also be observed that the bias provided by the spring 64 will always assure that the drag brake defined by brake elements 50 and 52 is at least lightly engaged so as to provide the necessary resistance to movement necessary to cause the cam action between the disks 46 and 56 upon relative movement between the shafts.

Thus, the invention advantageously employs a normally disengaged brake allowing the use of lighter spring loads thereby reducing weight and minimizing torque requirements. At the same time, the use of the drag brake assures proper actuation of the brake pack defined by the brake elements 70 and 72 when the input shaft 24 is unloaded, even to the point where the same has been disconnected from its control element as by a breakage in the system.

Finally, it will be appreciated that the camming force exerted by the balls 80 to separate the disks 46 and 56 to engage the main brake comprised of the elements 70 and 72 will likewise exert an increasing braking force on the disk 46 and thus the shaft 24 by reason of interaction of the brake elements 50 and 52. Thus, extremely positive braking action on both shafts is achieved according to the invention.

I claim:

1. A bi-directional brake for use in a drive train to permit a rotary driving element to drive a rotary driven element but not vice versa comprising:
   a rotary input shaft including a recess at one end;
   a rotary output shaft coaxial with said input shaft and having an end journalled in said recess;
   first axially extending splines associated with said input shaft;
   second axially extending splines associated with said output shaft;
   first and second, axially spaced, cam elements slidably received on said first splines and including ball ramp cam means at their interface;
   means coupling said second cam element to said rotary output shaft;
   a first fixed brake element in proximity to said first cam element oppositely of said second cam element;
   a first rotary brake element carried by said first cam element oppositely of said second cam element defining an interface and engageable with said first fixed brake element for providing a drag on said input shaft via said first cam element and said first spline;
   a brake pack associated with said second cam element including a plurality of second rotary brake elements; slidably received on said second splines and interleaved with a plurality of second fixed brake elements, said brake pack adapted to be compressed by axial movement of said second cam element;
   said first spline and said first and second cam elements defining a limited lost motion connection between said shafts; and
   means for biasing said second cam element toward said first cam element, and thus said first brake elements into engagement with each other.

2. The bi-directional brake of claim 1 wherein said limited lost motion connection is defined by said first splines which are in the form of radially directed tangs and radially inwardly opening recesses of larger dimension than the tangs in said first and second cam elements loosely receiving said tangs.

* * * * *